United States Patent [19]

Shoemaker et al.

[11] 3,919,017
[45] Nov. 11, 1975

[54] POLYISOCYANATE:FORMALDEHYDE BINDER SYSTEM FOR CELLULOSIC MATERIALS

[75] Inventors: Philip D. Shoemaker, Baker; Hobert O. McQueary, Sweet Home, both of Oreg.

[73] Assignee: Ellingson Timber Company, Baker, Oreg.

[22] Filed: Oct. 5, 1973

[21] Appl. No.: 404,026

[52] U.S. Cl. ........ 156/62.2; 144/309 D; 144/309 P; 144/309 Q; 144/309 Y; 156/307; 156/314; 156/331; 264/122; 428/424; 428/537
[51] Int. Cl.² .... B29J 5/00; B32B 21/02; C09J 5/04
[58] Field of Search . 106/163 R; 144/309 D, 309 P, 144/309 Q, 309 Y; 156/62.2, 307, 314, 315, 331; 161/190, 168, 261, 263, 270; 260/9; 264/122

[56] References Cited
UNITED STATES PATENTS

| | | | |
|---|---|---|---|
| 2,430,479 | 11/1947 | Pratt et al. | 156/331 |
| 3,043,794 | 7/1962 | Feiler et al. | 260/33.6 |
| 3,180,784 | 4/1965 | Meiler | 161/151 |
| 3,268,467 | 8/1966 | Rye | 260/29.3 |
| 3,440,189 | 4/1969 | Sharp | 260/9 |
| 3,666,593 | 5/1972 | Lee | 156/285 |
| 3,821,056 | 6/1974 | Reardon | 156/331 |

FOREIGN PATENTS OR APPLICATIONS

1,803,038  6/1969  Germany

OTHER PUBLICATIONS

Chemical Abstracts, Vol. 71, No. 71755b, (1969).

Primary Examiner—Charles E. Van Horn
Assistant Examiner—Robert A. Dawson
Attorney, Agent, or Firm—Kolisch, Hartwell, Dickinson & Stuart

[57] ABSTRACT

A process for bonding together cellulosic materials under conditions of elevated pressure and temperature using a binder system comprising an organic polyisocyanate and formaldehyde. This novel system provides strong, moisture-resistant bonds, and allows cellulosic materials containing up to about 22% moisture to be pressure consolidated without predrying. Use of the binder system in fabricating particleboard products is exemplified.

18 Claims, No Drawings

POLYISOCYANATE:FORMALDEHYDE BINDER SYSTEM FOR CELLULOSIC MATERIALS

BACKGROUND AND OBJECTS OF THE INVENTION

The present invention relates generally to a novel chemical binder system for cellulosic materials, and to the use of the novel system in manufacturing products from such materials. A preferred aspect of the invention concerns the manufacture of structural panels from comminuted wood using a polyisocyanate: formaldehyde binder system.

Many products are manufactured by the basic process of consolidating or joining together bodies of cellulosic materials using pressure, heat and a chemical binder. Included among them are wood-base products such as plywood, hardboard, particleboard, and veneer-faced particleboard, and pressed or molded products made from vegetable fibers, such as cornstalks, straw or bagasse, or from other cellulosic materials such as pulp, shredded paper or the like. Typically, the binders used in making such products are thermosetting resins such as phenol-formaldehyde, resorcinol-formaldehyde, melamine-formaldehyde, urea-formaldehyde, urea- furfural and condensed furfuryl alcohol resins. Other known binders include organic polyisocyanates, which have been used for gluing plywood, and, either alone or together with urea- or melamine-formaldehyde resins, as particleboard adhesives.

Each of the prior art binder systems has its drawbacks, however. For example, products manufactured using urea-formaldehyde resins, widely employed because of their low cost, are satisfactory for use in dry environments only. Moisture resistant products can be produced using phenol-formaldehyde or melamine-formaldehyde resins, but such binders are much more costly. The use of urea-formaldehyde resins ordinarily requires that the cellulosic starting material be dried to a moisture content of about 2–5% (based on the bone dry weight of the wood). Such drying is not required with polyisocyanate adhesives, but the affinity of isocyanates with metal causes severe sticking problems during product manufacture unless release films or anti-stick coatings are used.

A general object of the present invention, therefore, is to provide an improved binder system which is free from the drawbacks of prior art systems. Other objects and advantages of the invention will become apparent from the detailed description which follows.

SUMMARY OF THE INVENTION

It has unexpectedly been found that a binder system comprising an organic polyisocyanate and formaldehyde produces superior bonding between bodies of cellulosic materials consolidated using heat and pressure. The finished products have superior strength and moisture resistance, and can be formed from cellulosic starting materials having relatively high moisture contents, i.e., up to about 22%, without the necessity of predrying the material.

The polyisocyanate component of the novel binder system may suitably be any organic polyisocyanate compound containing at least 2 active isocyanate groups per molecule, or mixtures of such compounds. Polyphenylpolyisocyanates, such as diphenylmethane-4,4'-diisocyanate, are particularly suitable. The formaldehyde component of the system is preferably an aqueous formaldehyde solution of any convenient concentration, such as 37, 44%, etc.

The binder system components may be added or applied in any suitable manner, such as by brushing, dipping, spraying, roller coating, etc. In the preferred practice of the invention, the polyisocyanate and the formaldehyde solution are added or applied separately, since they are not inherently miscible. Adding or applying the binder system's components as an emulsion or dispersion or other combined form is within the scope of the invention, however.

The ratio of polyisocyanate to formaldehyde in the binder system is not critical, and the optimum ratio for a given application can be determined by routine experimentation. Polyisocyanate:formaldehyde ratios ranging from 2:3 to 5:1 have been successfully employed. Ordinarily, ratios ranging between about 1:1 and 4:1 are used, to control fuming problems, to obtain economies, etc. The quantity of binder needed in a particular application likewise can be determined by simple experimentation. Amounts in the range of 2–5% by weight, based on the dry weight of cellulosic material, have been used with good results.

By way of explaining the superior results achieved using the novel binder system of the invention, it is thought that isocyanate groups present in the polyisocyanate component of the system react with the free hydroxyl groups present in cellulosic materials to form urethane linkages. Thus, when bodies of cellulosic material are consolidated in the presence of polyisocyanates under conditions of elevated pressure and temperature, "urethane bridges" are formed between adjacent cellulosic bodies as follows:

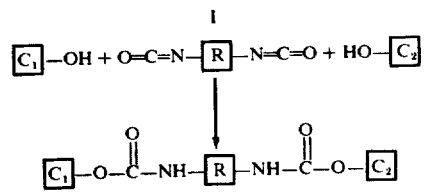

where $C_1$ and $C_2$ represent adjacent bodies of cellulosic materials, and R represents an organic group comprising the non-isocyanate "body" portion of a polyisocyanate molecule.

In addition, a portion of the polyisocyanate component reacts with water, present in the starting material in the form of moisture, to form a polyurea as follows:

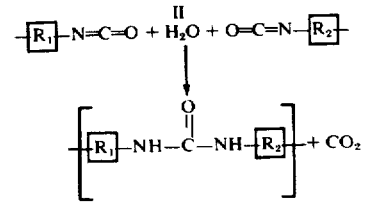

where $R_1$, $R_2$ represent organic groups comprising the non-isocyanate "body" portions of different polyisocyanate molecules.

The polyurea produced in this manner then reacts with the formaldehyde component of the binder system to form a polyurea- formaldehyde resin which aids in bonding the cellulosic bodies together.

DESCRIPTION OF PREFERRED EMBODIMENT

As will be appreciated, the novel polyisocyanate:formaldehyde binder system may be used in the manufacture of a wide variety of products from many different cellulosic materials or mixtures of such materials. By way of illustration, however, the invention will be described hereinafter particularly with respect to the manufacture of particleboard.

Particleboard is produced according to the invention by bonding together particles of wood or other cellulosic material using heat, pressure, and a binder system comprising a polyisocyanate and formaldehyde. As mentioned above, the polyisocyanate component of the binder system may be any organic polyisocyanate compound containing at least 2 active isocyanate groups per molecule. Such compounds include diphenylmethane diisocyanates, m- and p-phenylene diisocyanates, chlorophenylene diisocyanates, toluene di- and triisocyanates, triphenylmethane triisocyanates, and diphenyl ether-2,4,4'-triisocyanate. Polyisocyanate mixtures may also be used, such as PAPI, a commercially available, approximately trifunctional polymethylene polyphenylisocyanate marketed by the Upjohn Company, Polymer Chemicals Div.

Formaldehyde is a gas at ordinary temperatures. Therefore, the formaldehyde component of the system preferably is an aqueous formaldehyde solution, such as commercially available 37% solution.

The binder system components preferably are employed in a ratio of about one part polyisocyanate to one part formaldehyde (solids basis). However, the ratio of the components is not considered critical, and ratios ranging from about 2:3 to about 5:1 have been used with good success.

The starting material for the particleboard comprises particles of cellulosic material, typically wood particles derived from lumber manufacturing waste such as planer shavings, veneer chips, and the like. The methods for producing suitable particles are well known and conventional. If desired, mixtures of cellulosic particles may be used. Particleboard has been successfully produced, for example, from wood particle mixtures containing up to about 30% bark. The moisture content of the particles suitably may range up to about 22% by weight. Typically, particles made from lumber waste materials contain about 10–20% moisture, and may be used without first being dried. To obtain maximum economies in the dryer operation, ordinarily particles would be used having a moisture content ranging upwardly from about 6%. Particles containing lesser amounts of moisture may be used, however, such needlessly adds to dryer cost.

Particleboard is fabricated, according to preferred practice, by spraying the particles with binder as they are tumbled or agitated in a blender. Suitably, about 2–5% by weight of the binder system is added, based on the "bone dry" weight of the particles. The binder system components are separately added or applied to the particles in order to avoid premature reactions between them. The order of addition is unimportant, however, and the components may be added simultaneously, if desired. Other materials, such as wax sizing or fire retardant, may also be added to the particles during the blending step.

After sufficient blending to produce a uniform mixture, the coated cellulosic particles are formed into a loose mat or felt, preferably containing between about 12 and 18% moisture by weight. The mat is then placed in a heated press between polished caul plates which have been treated with an anti-stick composition, and compressed to consolidate the particles into a board. Pressing times, temperatures and pressures vary widely depending on the thickness of the board produced, the desired density of the board, the size of the particles used, and other factors well known in the art. By way of example, however, for ½" thick particleboard of medium density, pressures of about 300–350 psi and temperatures of about 325°–375°F. are typical. Pressing times are typically about 2–5 minutes. Because a portion of the moisture present in the mat reacts with polyisocyanate to form polyurea, as described earlier, it does not have to be evaporated during the pressing cycle. Shorter pressing times result, an additional advantage of the novel binder system.

Particleboard produced as described has strength properties which equal or better those of conventional urea-formaldehyde bonded particleboard. In addition, the moisture resistance of the product is at least equal that of phenol-formaldehyde bonded board. These properties are thought to at least partially result from the direct chemical bonds formed by the urethane bridges between adjacent particles in the board, as illustrated in reaction I above, augmented by adhesive bonding from the polyurea-formaldehyde resin formed in situ.

The following examples, which are meant to be illustrative and not limiting, are given to describe further the use of the novel invention.

EXAMPLE I

A particleboard panel is prepared as follows from Ponderosa pine planer shavings which have been hammermilled to pass a ¼" diamond screen. A 2 kilogram charge of these particles, which have a moisture content of about 11.5% by weight, is placed in a baffled drum-type blender. With the blender drum rotating, the tumbling particles are separately sprayed with about 48 grams of a 37% aqueous solution of formaldehyde, and about 35.5 grams of a liquid polymethylene polyphenylisocyanate marketed as PAPI. To reduce moisture absorption in the finished product, about 35.5 grams of a microcrystaline wax emulsion containing 50% by weight wax solids is also added. A suitable emulsion is marketed as "Paracol 915N" by Hercules, Inc.

After sufficient tumbling to obtain a uniform distribution of the additives, the coated particles are removed from the blender and felted into a mat about 3 inches thick. The mat, containing about 15% by weight moisture, is then formed into a ½ inch thick particleboard panel in an electrically heated, hydraulically operated laboratory press. The press is maintained at a temperature of about 350°F., and a 5 minute press cycle is used. Polished caul plates bound each side of the mat while it is being pressed, and to prevent the particleboard from sticking to these plates, silicone-coated release sheets are placed between each caul plate and the mat. The resulting particleboard panel has a density of about 42 pounds per cubic foot, and has smooth, unblistered surfaces. When tested using industry standard ASTM procedures, the modulus of rupture (MOR), modulus of elasticity (MOE), and internal bond (IB) values equal or exceed those of conventional urea-formaldehyde bonded particleboard of the same thickness. In addition, the board's moisture resistance equals or exceeds that of particleboard made using a phenol-formaldehyde resin binder.

EXAMPLE II

To demonstrate the ability of the novel polyisocyanate:formaldehyde binder system to bond together different varieties of cellulosic materials, a paper-faced particleboard product is produced as follows:

While tumbling in a drum-type blender, a charge consisting of 1700 grams Ponderosa pine planer shavings hammermilled to pass a ¼ inch diamond screen and having a 12.6% moisture content, and 700 grams screened −5, +16 Tyler) Ponderosa pine bark particles containing 9.0% moisture is separately sprayed with about 57.5 grams of a 37% aqueous formaldehyde solution and about 63.5 grams of PAPI. About 42.4 grams of Paracol 915N wax sizing is also added. The resulting mixture of coated wood and bark particles contains about 13.1% moisture by weight. After blending, the particle mixture is formed into a mat on a 0.018 inch sheet of phenol-formaldehyde coated Crezon, a resin-treated paper produced by Crown Zellerbach Corporation. A second Crezon sheet is placed on top of the mat, and the resulting sandwich is pressed at about 375°F. and a maximum pressure of 315 psi for 5 minutes to a thickness of 0.5 inch. The resulting paper-faced panel has a particleboard core containing about 30 % bark on a dry basis. The board has an average density of 41.3 pounds per cubic foot, an average MOR of 2,125 psi, and an average MOE of 338,500 psi when tested using ASTM procedures. The paper facing is very tightly bonded to the particle core and the resulting panel has excellent moisture resistance.

EXAMPLE III

A high strength structural panel is formed as follows:

While being tumbled in a blender, two kilograms of Ponderosa pine planer shavings hammermilled to pass a ¼inch diamond screen and containing 11.6% moisture by weight are separately sprayed with about 47.8 grams of a 37% aqueous formaldehyde solution and about 53.1 grams of PAPI. In addition, about 35.4 grams of Paracol 915N wax sizing is added. The coated particles are then formed into a mat on a 0.10 inch Douglas fir veneer sheet which has been spray coated with 3 grams per square foot of PAPI. A second indentical PAPI-coated veneer sheet is placed on top of the particle mat, and the resulting sandwiched is pressed at about 375°F. and a maximum pressure of about 315 psi for about 5 minutes to a thickness of 0.5 inch. The veneer-coated particleboard produced in this manner has an average density of 40.5 pounds per cubic foot, an average MOR of 11,155 psi, and an average MOE of 1,280,750 psi. By way of comparison, a standard ½ inch Douglas fir plywood panel is similarly tested, and has an MOR of 5,360 psi and an MOE of 716,600 psi.

EXAMPLE IV

A veneer-faced particleboard panel is produced as described in Example III except that the veneer face sheets are sprayed with 2 grams per square foot of a phenol-formaldehyde resin rather than the polyisocyanate resin used in Example III. A suitable phenol-formaldehyde resin is a 48% solids liquid resin designated OPL-197A and sold by the Coos Bay Division of Georgia-Pacific Corporation. The resulting product is equivalent to that obtained by the procedure of Example III, but problems resulting from occasional sticking of the panel to the press caul plates are eliminated, thus eliminating the necessity to treat the caul plates with a release composition.

The present invention provides an improved binder system for cellulosic materials offering distinct advantages over prior art systems. A significant advantage is the ability to bond together materials having relatively high moisture contents, eliminating the necessity of predrying the material. Thus, for example, particleboard may be formed from undried wood chips, planer shavings, bark etc., having moisture contents ranging from about 6 to about 22%. Despite such high moisture contents, consolidated products may be produced without experiencing blistering or "blows" caused by steam formation during the press cycle.

A further significant advantage of the novel binder system is that consolidated products may be made from previously unusable mixtures of cellulosic materials. Thus, for example, particleboard products incorporating a relatively high percentage of bark may be produced.

Additionally, compared with known prior art polyisocyanate binders, sticking problems are greatly reduced, and no separate catalyst is required.

As used herein, the term "cellulosic material" includes any material substantially formed from cellulose including natural materials such as wood in various forms, bark, vegetable fibers such as straw, corn stalks and bagasse, etc., and processed materials such as chemical and mechanical pulp, paper, etc. The term "body" refers to such materials in any solid form such as blocks, sheets, particles, fibers, etc. The term "coating" includes covering only a portion of a body as well as to covering all of the body.

While a particular embodiment of the invention has been described, variations and modifications are obviously possible without departing from the spirit of the invention, and it is not intended by this disclosure to be limited to the specific details enumerated above.

It is claimed and desired to secure by letters patent:

1. A method for joining together bodies of cellulosic material, comprising
   providing a plurality of said bodies,
   coating said plurality with a composition, containing an organic polyisocyanate compound having at least 2 active isocyanate groups per molecule
   coating said plurality with formaldehyde, and
   bringing said bodies into pressure contact and maintaining said contact at an elevated temperature for a time sufficient to form a permanent bond between the bodies.

2. The method of claim 1, wherein said cellulosic material is selected from the group consisting of wood particles, bark particles, paper, and wood veneer.

3. The method of claim 2, wherein said polyisocyanate compound is a polyphenylpolyisocyanate.

4. A method for manufacturing a product comprising comminuted cellulosic material, including
   providing a mass of such material,
   coating the material with composition, containing an organic polyisocyanate compound having at least 2 active isocyanate groups per molecule
   coating the material with formaldehyde and
   consolidating the coated mass by applying pressure and heat for a time sufficient to bond the material together.

5. The method of claim 4, wherein said cellulosic material is selected from the group consisting of wood particles and bark particles.

6. The method of claim 5, wherein said polyisocyanate compound is a polyphenylpolyisocyanate.

7. In the process of manufacturing a product comprising cellulosic material and a binder therefor, wherein said material is first coated with a binder composition, and the coated material is then bonded together by compression at elevated temperature, the improvement wherein the cellulosic material is coated with a composition containing an organic polyisocyanate compound having at least 2 active isocyanate groups per molecule and with formaldehyde which comprise a binder system for the material.

8. The improvement of claim 7, wherein said cellulosic material is selected from the group consisting of wood particles, bark particles, paper, and wood veneer.

9. The improvement of claim 8, wherein said polyisocyanate compound is a polyphenylpolyisocyanate.

10. The improvement of claim 7, wherein said cellulosic material, before being coated with said binder system, has a moisture content between about 6 and about 22% by weight, based on the dry weight of the cellulosic material.

11. A method for manufacturing a particleboard product comprising comminuted cellulosic material, including the steps of
providing a mass of moisture-containing comminuted cellulosic material,
coating said mass with composition, containing an organic polyisocyanate compound having at least 2 active isocyanate groups per molecule
coating said mass with formaldehyde, and
consolidating the coated mass under conditions of elevated pressure and heat, whereby said comminuted material is bonded together.

12. The method of claim 11, wherein said cellulosic material is selected from the group consisting of wood particles and bark particles.

13. The method of claim 12, wherein said polyisocyanate compound is a polyphenylpolyisocyanate.

14. The method of claim 11, wherein said comminuted cellulosic material, before coating, has a moisture content between about 6 and about 22% by weight based on the dry weight of the cellulosic material.

15. The method of claim 2, wherein said formaldehydecoating step is performed by coating said plurality with an aqueous formaldehyde solution.

16. The method of claim 5, wherein said formaldehydecoating step is performed by coating said material with an aqueous formaldehyde solution.

17. The improvement of claim 8, wherein the formaldehyde is in the form of an aqueous formaldehyde solution.

18. The method of claim 12, wherein said formaldehyde coating step is performed by coating said mass with an aqueous formaldehyde solution.

* * * * *